(12) United States Patent
Grider et al.

(10) Patent No.: US 8,180,509 B2
(45) Date of Patent: May 15, 2012

(54) TAIL PIPE EMISSIONS MODE CONTROL FOR HYBRID ELECTRIC VEHICLES

(75) Inventors: Duane M. Grider, Farmington Hills, MI (US); Bruce Carvell Blakemore, Plymouth, MI (US); Daniel William Forthoffer, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 12/402,940

(22) Filed: Mar. 12, 2009

(65) Prior Publication Data

US 2010/0235016 A1     Sep. 16, 2010

(51) Int. Cl.
*B60W 10/04* (2006.01)
(52) U.S. Cl. ......................................................... 701/22
(58) Field of Classification Search .................... 701/22, 701/99
See application file for complete search history.

(56) References Cited

U.S. PATENT DOCUMENTS

| | | | |
|---|---|---|---|
| 5,832,396 A | 11/1998 | Moroto et al. | |
| 5,892,346 A | 4/1999 | Moroto et al. | |
| 6,038,505 A | 3/2000 | Probst et al. | |
| 6,098,734 A | 8/2000 | Kawamura | |
| 6,483,198 B2 | 11/2002 | Schmitz et al. | |
| 6,487,477 B1 * | 11/2002 | Woestman et al. | 701/22 |
| 6,697,717 B2 * | 2/2004 | Shioda et al. | 701/22 |
| 6,814,170 B2 * | 11/2004 | Abe et al. | 180/65.25 |
| 8,005,587 B2 * | 8/2011 | Tamor et al. | 701/22 |
| 2007/0208467 A1 | 9/2007 | Maguire et al. | |
| 2009/0240388 A1 * | 9/2009 | Harris | 701/22 |
| 2010/0280887 A1 * | 11/2010 | Eckhoff et al. | 705/14.1 |

FOREIGN PATENT DOCUMENTS

| | | |
|---|---|---|
| EP | 1842758 A1 | 10/2007 |
| EP | 2151362 A1 | 2/2010 |
| WO | 2009045166 A1 | 4/2009 |
| WO | 2009117300 A1 | 9/2009 |

OTHER PUBLICATIONS

GB Search Report for application No. 1003712.5 dated Jul. 2, 2010, 1 page.

* cited by examiner

*Primary Examiner* — Kevin Hurley
(74) *Attorney, Agent, or Firm* — David B. Kelley; Brooks Kushman, P.C.

(57) ABSTRACT

A hybrid electric vehicle has a propulsion system including an internal combustion engine (ICE) and an electric motor each configured to operate in parallel and each configured to propel the vehicle individually. A rechargeable battery is configured to deliver power to the electric motor to enable the electric motor to propel the vehicle for a certain distance without operation of the ICE. The rechargeable battery is further configured to receive power from a household power outlet. A controller is configured to control the propulsion system to operate in either a normal emissions mode or a no-emissions mode wherein the ICE is disabled. The controller is further configured to direct the propulsion system to operate in the no-emissions mode in response to the broadcast of an external control signal.

18 Claims, 3 Drawing Sheets

TAIL PIPE EMISSIONS MODE CONTROL FOR HYBRID ELECTRIC VEHICLES

BACKGROUND

1. Technical Field

Embodiments of the invention disclosed herein relate to the field of hybrid electric vehicles that are configured to either automatically or manually operate in a no-emissions mode or a reduced emissions mode when the vehicle receives an externally generated signal.

2. Background Art

Some state governments, municipalities, and other governing bodies have established agencies and task forces to monitor and control levels of undesirable atmospheric gases that are produced by, among other sources, vehicles. The goal of these agencies is to reduce the buildup of undesirable atmospheric gases and particulates caused by the combustion of fossil fuels. In some instances, some government boards have imposed restrictions that may lead to the restriction of sale of products in their region from vehicle producers that cannot or do not provide vehicles that help these boards and agencies meet their established air quality objectives.

Compounding the problems faced by some of the above-mentioned agencies and task forces is the fact that some populated regions of the world have a geography, topography, climate and/or atmospheric conditions which have a lower natural replacement rate of atmospheric gases. It may be especially desirable in these regions to minimize the buildup of gases that are caused by the combustion of fossil fuels, and in particular, the tailpipe emissions of transportation vehicles powered by internal combustion engines as vehicles travel through these regions. It may be desirable in these regions or elsewhere to strictly control the production of undesirable atmospheric gases by transportation vehicles. Embodiments of the invention disclosed herein address this and other problems.

SUMMARY

Various embodiments of a hybrid electric vehicle are disclosed herein. In a first embodiment, the hybrid electric vehicle comprises a propulsion system that includes an internal combustion engine (ICE) and an electric motor, each of which is configured to propel the vehicle individually or in parallel with each other. A controller is configured to control the propulsion system to operate in a normal emissions mode wherein the ICE is enabled to propel the vehicle and a no-emissions mode wherein the ICE is disabled. In this first embodiment, the controller is further configured to direct the propulsion system to operate in the no-emissions mode in response to an external control signal that is transmitted to the vehicle from a source positioned external to the vehicle.

In an implementation of the first embodiment, the hybrid electric vehicle further comprises a receiver that is configured to receive the external control signal such that the receiver transmits the external control signal to the controller to automatically control the propulsion system to operate in the no-emissions mode. In a variation of this embodiment, the receiver is configured to receive radio frequency signals. In another variation, the receiver is configured to receive infrared signals. In another variation, the receiver is configured to receive at least one of a wireless fidelity (Wi-Fi) signal or a signal transmitted by a portable device that is configured to connect wirelessly to the Internet. In another variation, the receiver is configured to receive cellular telephone signals. In still another variation, the receiver is configured to receive a satellite signal. In other embodiments the vehicle may include a switch to enable manual activation of a no-emissions mode operation of the propulsion system.

In a second embodiment, a plug-in hybrid electric vehicle comprises a propulsion system that is configured to propel a vehicle throughout normal operations of the vehicle. The propulsion system includes an internal combustion engine (ICE) and an electric motor. The ICE and the electric motor are configured to operate in parallel. The ICE and the electric motor are each further configured to individually propel the vehicle. The plug-in hybrid electric vehicle further comprises a rechargeable battery that is configured to deliver power to the electric motor to enable the propulsion system to propel the vehicle for a certain distance of vehicle travel without operation of the ICE. The rechargeable battery is further configured to receive electrical power from the ICE and also to receive electrical power from at least one of a remote charger, a charging station or a power outlet of a household. The plug-in hybrid electric further includes a controller that is configured to control the propulsion system to operate in a normal emissions mode wherein the ICE is enabled to project the vehicle and a no-emissions mode wherein the ICE is disabled. The plug-in hybrid electric vehicle further comprises a receiver that is configured to receive an external control signal from a source that is positioned external to the vehicle such that the receiver transmits the external control signal to the controller. The plug-in hybrid electric vehicle further includes a navigation system that is configured to generate a location signal corresponding to a geographic area in which the vehicle is positioned such that the navigation system transmits the location signal to the controller. In this second embodiment, the external control signal includes information that is indicative of an emissions requirement for a designated geographic area. The controller is further configured to determine whether the vehicle is located within the designated geographic area based on the location signal. The controller is still further configured to control the propulsion system to operate in the no-emissions mode in response to the receiver receiving the external control signal while the vehicle is located within a designated geographic area.

In an implementation of the second embodiment, the controller is further configured to control the ICE to charge the rechargeable battery. The controller is still further configured to determine whether the vehicle is heading towards the designated geographic area based on a plurality of the location signals. The controller is still further configured to control the ICE to charge the rechargeable battery when the controller determines that the vehicle is heading towards the designated geographic area.

In a variation of this implementation, the navigation system is configured to record a driver's travel route. The controller is further configured to control the ICE to charge the rechargeable battery when the navigation system determines that the vehicle is traveling along a recorded driver travel route and that the recorded driver travel route passes through the designated geographic area.

In a further variation of this implementation, the navigation system is configured to record a plurality of different driver travel routes that the driver historically travels. The controller is further configured to control the ICE to charge the rechargeable battery when the navigation system determines that the vehicle is traveling along one of the different driver travel routes and that the once of the plurality of different driver travel routes passes through the designated geographic area.

In another variation of this implementation, the navigation system is configured to record the travel route for a plurality of different drivers. The controller is further configured to control the ICE to charge the rechargeable battery when the navigation system determines that the vehicle is traveling along the recorded driver travel route associated with one of the different drivers and that the recorded driver travel route passes through the designated geographic areas.

In a further variation of this implementation, the navigation system is configured to record a plurality of different travel routes associated with each driver of the plurality of different drivers. The controller is further configured to control the ICE to charge the rechargeable battery when the navigation system determines that the vehicle is traveling along one of the different travel routes of an associated one of the drivers and the one of the different travel routes passes through the designated geographic areas.

In another implementation of the second embodiment, the receiver is further configured to receive at least one of a radio frequency signal, an infrared signal, a Wi-Fi signal, a cellular telephone signal, and a satellite signal.

In another implementation of the second embodiment, the receiver is configured to receive a radio frequency signal, an infrared signal, and a Wi-Fi signal.

In a third embodiment, a plug-in hybrid electric vehicle includes a propulsion system that is configured to propel a vehicle throughout normal operations of the vehicle. The propulsion system includes an internal combustion engine (ICE) and an electric motor. The ICE and electric motor are configured to operate in parallel. The ICE and electric motor are each further configured to propel the vehicle individually. The ICE is further configured to operate in a standard and emissions mode and in a low emissions mode. The plug-in hybrid electric vehicle further includes a rechargeable battery that is configured to deliver power to the electric motor to enable the propulsion system to propel the vehicle for a certain distance of vehicle travel without operation of the ICE and to receive electrical power from at least one of a remote charger, a charging station or a power outlet of a household. The plug-in hybrid electric vehicle further includes a controller that is configured to control the propulsion system to operate in a normal emissions mode wherein the ICE is enabled to operate in the standard emissions mode, a reduced emissions mode wherein the ICE is enabled to operate in the low emissions mode, and a no-emissions mode wherein the ICE is disabled. In this third embodiment, the controller is further configured to control the propulsion system to operate in the no-emissions mode in response to an external control signal that is transmitted to the vehicle from a source positioned external to the vehicle.

In an implementation of the third embodiment, the controller is configured to control the propulsion system to operate in the reduced emissions mode when the external control signal is transmitted to the vehicle during a period when the rechargeable battery has an amount of stored electrical energy that is insufficient to propel the vehicle without assistance from the ICE.

In another implementation of the third embodiment, the controller is configured to control the propulsion system to discontinue operations in the no-emissions mode and to commence operations in the reduced emissions mode when the amount of electrical energy stored in the battery is depleted to a level that is insufficient to operate the vehicle without assistance from the ICE.

In another implementation of the third embodiment, the plug-in hybrid electric vehicle further comprises a receiver that is configured to receive the external control signal. The controller is further configured to automatically direct the propulsion system to operate in one of the reduced emissions mode and the no-emissions mode when the receiver receives the external control signal. In a variation of the implementation, the plug-in hybrid electric vehicle further comprises a navigation system that is connected to the controller. The navigation system is configured to generate a location signal corresponding to a geographic area in which the vehicle is positioned such that the navigation signal transmits the location signal to the controller. The external control signal includes information that is indicative of an emissions requirement for a designated geographic area. The navigation system is configured to determine whether the vehicle is located within the geographic area. The controller is configured to control the propulsion system to operate in one of the no-emissions mode and the reduced emissions mode in response to the receiver receiving the external control signal while the vehicle is located within the designated geographic area.

BRIEF DESCRIPTION OF THE DRAWINGS

The description herein makes reference to the accompanying drawings wherein like reference numerals refer to like parts throughout the several views, and in which.

DETAILED DESCRIPTION OF EMBODIMENTS OF THE INVENTION

Figure 1:
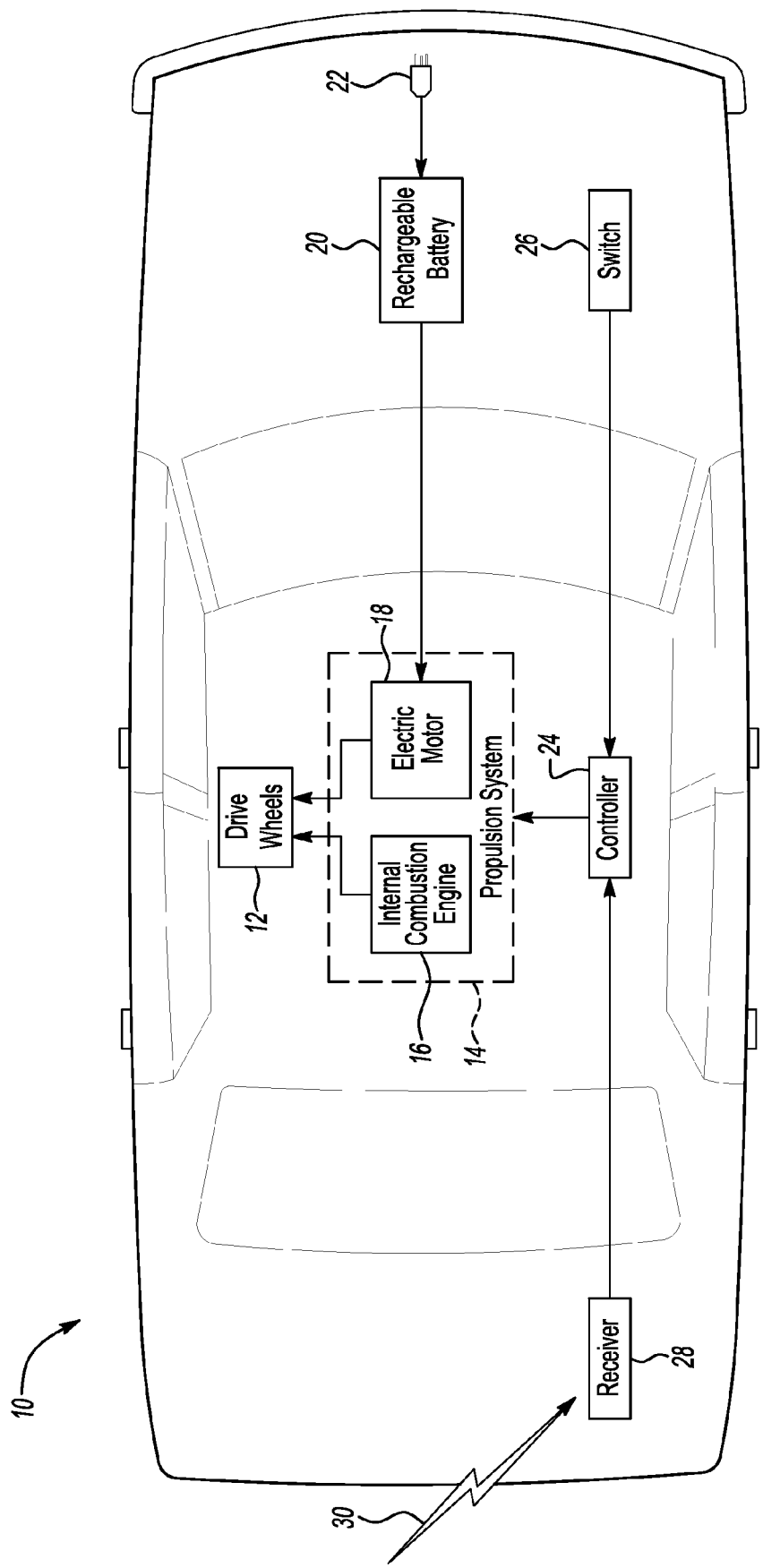
FIG. 1 illustrates a system for operating a plug-in hybrid electric vehicle having a controller configured to control an emissions output of the vehicle's propulsion system in response to an external signal requesting compliance with predetermined emissions standards.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Vehicles having a hybrid power train utilize more than one power source and more than one fuel source to propel the vehicle. For example, recent technological developments have produced production and prototype versions of vehicles having gasoline/electric propulsion systems, diesel/electric propulsion systems and fuel cell/electric hybrid propulsion systems. Some hybrid propulsion systems include plug-in rechargeable versions. These power trains may use an onboard gasoline, diesel or hydrogen fuel to propel the vehicle and they also use electricity produced or stored onboard to propel the vehicle. The usage of one of these onboard fuels to propel the vehicle (for example, electricity) may reduce or eliminate the immediate production of exhaust gases while the vehicle is being propelled whereas the use of the other type of fuel (for example, gasoline or diesel) may increase or cause the production of undesirable atmospheric gases.

Vehicles having hybrid power trains or hybrid propulsion systems are also known as hybrid electric vehicles and generally come in one of two configurations. In a first configuration, a hybrid electric vehicle is arranged such that an internal combustion engine and an electric motor operate in series. In such an arrangement, the electric motor is configured to deliver torque to the drive wheels of the vehicle and is powered by a battery connected to the electric motor. The internal combustion engine is not connected or otherwise configured to deliver torque to the drive wheels. Rather, in a series arrangement, the internal combustion engine delivers an electric charge to the rechargeable battery that powers the electric motor. In operation, the electric motor propels the vehicle through all speeds and driver demands by consuming the available electric power stored in the rechargeable battery. When the rechargeable battery depletes below a predetermined level, the internal combustion engine begins to operate and delivers electric energy to the rechargeable battery.

An alternative configuration for a hybrid electric vehicle is a blended or parallel type configuration. In a blended hybrid electric vehicle both the electric motor and the internal combustion engine are configured to deliver torque to the drive wheels of the vehicle and each torque source can either propel the vehicle independently or cooperate with each other to propel the vehicle.

In operations, both types of hybrid vehicles, series and blended, recharge the rechargeable battery by, among other things, capturing some of the energy generated during vehicle braking and using that energy to recharge the rechargeable battery. In hybrid vehicles having a series configuration, such recharging of the battery helps to sustain the battery charge above a desirable level and diminishes the frequency with which the battery drops below that level, at which point in time, the internal combustion engine may commence operations to recharge the rechargeable battery. In a blended hybrid vehicle, the rechargeable battery is recharged using otherwise wasted energy such as energy dissipated during vehicle braking and then uses that energy to operate the electric motor to assist the internal combustion engine when, for instance, the propulsion system receives an elevated level of driver demand for torque. In other instances, the rechargeable battery will supply electric energy to the electric motor to allow the vehicle to operate for brief periods without the internal combustion. An example of a brief period where the internal combustion engine may shut off and vehicle systems may be operated exclusively by the rechargeable battery and the electric motor include instances where the vehicle is stopped such as for a traffic light.

Recent technological developments in the area of battery technologies has made it feasible to configure a hybrid electric vehicle such that the rechargeable battery is capable of supplying a sufficient amount of electric energy to the electric motor to allow the electric motor to propel the vehicle without the assistance of the internal combustion engine for a certain distance (for example, 20 miles). The rechargeable battery in such a vehicle may be further configured to receive electric power from a plug connecting the rechargeable battery to a standard household electrical outlet. As used herein, the term standard household electrical outlet refers to an electric outlet having approximately 120 volts. The rechargeable battery may be further configured to receive a charge from outlets having 240 volts or any other voltage. Such vehicles, commonly known as plug-in hybrid electric vehicles, have rechargeable batteries that are capable of storing and delivering substantially more power than the power delivered by current technology rechargeable batteries in use with non-plug-in or conventional hybrid electric vehicles. Despite this difference in storage, it should be understood that the teachings of the present invention are equally compatible with both hybrid electric vehicles and plug-in hybrid electric vehicles.

Plug-in type hybrid electric vehicles may be configured such that the internal combustion engine and the electric motor operate either in series or in blended/parallel. Other configurations are also possible and the teachings of the invention disclosed herein may be applicable with such additional configurations.

State governmental agencies as well as other agencies and task forces have been established to monitor and control the levels of undesirable atmospheric gases produced by vehicles in some regions of the world. Some government boards/agencies may impose restrictions that lead to the restriction of the sale of products within their region that cannot or do not help these boards and agencies meet their established air quality objectives. Furthermore, some populated regions of the world have geographic topography, climate and/or atmospheric conditions which have a lower natural replacement rate of atmospheric acids. Such populated regions include, for example, the Los Angeles basin, and the San Fernando Valley, both in California in the United States. It is desirable in these regions and others to minimize the buildup of undesirable gases that are caused by combustion and, in particular, the tailpipe emissions of transportation vehicles powered by internal combustion engines. The governments or municipalities corresponding to a given geographic region may, on a day-to-day basis issue orders which require that vehicles operating within a designated geographic area comply with a government ordered tailpipe emissions restriction. For example, on any given day, the government for the City of Los Angeles may determine that, for a specified period of time, vehicles traveling within the city limits be prohibited from emitting undesirable levels of tailpipe emissions or that such vehicles be prohibited from emitting any amount of undesirable gases.

Embodiments of the present invention are intended to address this and other problems by enabling a blended hybrid electric vehicle to comply with such anticipated governmental restrictions. It is anticipated that governmental bodies, municipalities or agencies of such bodies may, at their discretion, transmit a signal to communicate with drivers within their geographic jurisdiction or to communication with the vehicles being driven within the geographic jurisdiction to request the reduction or elimination of tailpipe emissions.

In the various embodiments discussed herein, the hybrid electric vehicle being driven is configured to switch from standard hybrid operations to electric-only operations wherein the internal combustion engine of the vehicle is disabled and the vehicle produces no tailpipe emissions. In some embodiments, the signal being broadcast by the governmental agency may be received by a receiver that alerts the vehicle operator to manually switch the vehicle from standard hybrid operations to electric only operations. In other embodiments, the signal may be received by the vehicle and, in response, the vehicle will automatically switch from standard hybrid operations to electric only operations in a transition that may be undetectable to the vehicle operator.

In other embodiments, the hybrid electric vehicle may be equipped with a navigation system and may be further configured such that the internal combustion engine can deliver electric power to the rechargeable battery to recharge it. In other embodiments, the internal combustion engine may be configured to deliver electric power to the battery at a high rate and a low rate. Such vehicles may further include navigation systems which allow onboard systems to determine that the vehicle is heading towards a low or no emissions geographic region and may commence battery charging operations or may aggressively charge the rechargeable battery by switching from a low rate of charge to a high rate of charge in anticipation of entering the geographic region demanding reduced or zero tailpipe emissions.

In still other embodiments, the internal combustion engine may be configured to operate in a standard emissions mode wherein an engine controller may optimize engine operations to produce the highest amount of horsepower and a lower emissions mode wherein the engine controller may optimize operations of the internal combustion engine to produce the lowest possible level of tailpipe emissions while maintaining a minimum predetermined level of horsepower output. In such embodiments, in the event that the rechargeable battery has an insufficient amount of stored electric energy to propel the vehicle through the designated geographic area, the vehicle may still be operated in a reduced emissions mode wherein the vehicle will be able to complete the intended journey despite the depletion of electric power from the rechargeable battery while still partially complying with the emissions requirement of the designated geographic area.

A greater understanding of the embodiments of the invention described herein may be gained through a review of the figures accompanying this application together with a review of the detailed description of those figures below.

With respect to FIG. 1, an embodiment of a plug-in hybrid electric vehicle 10 is illustrated. Vehicle 10 may be configured as any type of motor vehicle including, but not limited to, sedans, coupes, sport utility vehicles, pickup trucks, minivans, full size vans, motorcycles, and buses. Vehicle 10 includes at least one drive wheel 12 to convert torque into motion.

Vehicle 10 further includes a propulsion system 14. Propulsion system 14 generates torque and delivers that torque to drive wheel 12. Propulsion system 14 includes any type of combustion engine ("ICE") 16 which, through the controlled combustion of fuels, including gasoline, diesel, blends of gasoline and alcohol, and hydrogen, generates some of the torque that is delivered by propulsion system 14 to drive wheels 12. ICE 16 is further configured to generate enough torque to propel vehicle 10 independently without the assistance of an electric motor or any other torque source.

Propulsion system 14 further includes electric motor 18 which converts electricity into torque. Electric motor 18 is configured to deliver torque to drive wheels 12. Electric motor 18 is configured to deliver a sufficient amount of torque to drive wheels 12 to enable the propulsion system to propel vehicle 10 without the assistance of ICE 16 or any other torque source.

A rechargeable battery 20 is configured to store electric energy and to deliver electricity to electric motor 18. Rechargeable battery 20 is further configured to receive an electric charge from a standard household electrical outlet through, for instance, plug 22. Rechargeable battery 20 is further configured to store a sufficient amount of electric energy to deliver enough electricity to electric motor 18 to allow electric motor 18 to propel vehicle 10 for a certain distance without the assistance of ICE 16. The certain distance may vary depending upon the demands placed upon electric motor 18 and rechargeable battery 20 such as through heavy or aggressive acceleration or sustained high speed travel of vehicle 10.

In some embodiments, rechargeable battery 20 may be configured to store between 10 kWh and 12 kWh which may be sufficient to enable an electric motor having an output of 40 Horsepower to 60 Horsepower to propel a vehicle 10 weighing between 3,000 pounds and 3,500 pounds for a distance of between 20 miles and 30 miles during sustained vehicle operations of speeds up to and including 40 miles per hour. An increase in the weight of the vehicle or the speed at which the vehicle is traveling will have a corresponding reduction in the distance that the vehicle can operate without ICE 16.

A controller 24 is configured to control the propulsion system to operate in either a normal emissions mode wherein the ICE is enabled to direct torque to drive wheel 12, or to operate in a no-emissions mode wherein the ICE is disabled. In some embodiments controller 24 is an engine control unit or other type of microprocessor configured to implement engine control and other types of algorithms.

Vehicle 10 may further include a switch 26 mounted within a passenger compartment of vehicle 10 and operable by a user of vehicle 10. Switch 26 may be connected to or otherwise be in communication with controller 24 and may be operable to instruct controller 24 to switch propulsion system 14 from operations in a normal emissions mode to operations in a no-emissions mode and vice versa. In embodiments of vehicle 10 equipped with switch 26, propulsion system 14 may be controlled as follows.

A governmental agency may implement a no-emissions requirement for the designated geographic area and may broadcast that requirement via a radio signal, television signal or other electronic means or may communicate the no-emissions requirement through the posting of signs on roads leading towards the designated geographic area. The no-emissions requirement may also be communicated in any other suitable manner effective for alerting an occupant of vehicle 10 of the no-emissions requirement for the designated geographic area.

After receiving notification of the no-emissions requirement, an occupant of vehicle 10 may move switch 26 from a position corresponding to the normal emissions mode to a position corresponding to the no-emissions mode. The actuation of switch 26 may send a signal to controller 24 to disable ICE 16 and thus cause vehicle 10 to be propelled solely by electric motor 18. Subsequent to the initiation of no-emissions mode, if the government agency or other controlling body determines that the no-emissions requirement is no longer needed, it can broadcast a second signal rescinding the no-emissions requirement. On receipt of the rescinding signal, which may be transmitted in any of the methods discussed above, an occupant of vehicle 10 need only move switch 26 from the position corresponding to the no-emissions mode back to the positioned corresponding to the normal emissions mode.

Vehicle 10 may optionally include a receiver 28 for receiving an external control signal 30 transmitted from a position external to vehicle 10. External control signal 30 may be broadcast by a governmental body or an agency thereof and may convey instructions that a designated geographic area currently requires that vehicles passing therethrough be operated in no-emissions mode. External control signal 30 may be a radio frequency signal, an infrared signal, a wireless fidelity (Wi-Fi) signal, a signal transmitted by portable devices that are configured to wirelessly connect to the Internet, a cellular telephone signal, a satellite signal or any other signal which humans without the aid of specialized equipment, are incapable of perceiving. Receiver 28 may be configured to receive any one or more or all of the above described signal types. Receiver 28 may be further configured to convey or transmit external control signal 30 to controller 24.

In response to receiving external control signal 30 as conveyed by receiver 28, controller 24 may control propulsion system 14 to operate in no-emissions mode. In embodiments including receiver 28, the act of controlling propulsion system 14 to disable ICE 16 and operate in no-emissions mode occurs automatically without action required by a vehicle occupant and, in some embodiments, may be substantially invisible or otherwise undetectable to an occupant of vehicle 10. In other embodiments, an indication may be given by some vehicle system to an occupant of the vehicle to indicate that propulsions system 14 is being operated in no-emissions mode. In embodiments, an occupant of vehicle 10 may have the option to disable no-emissions mode by, for example, providing a switch similar to switch 26.

Figure 2:
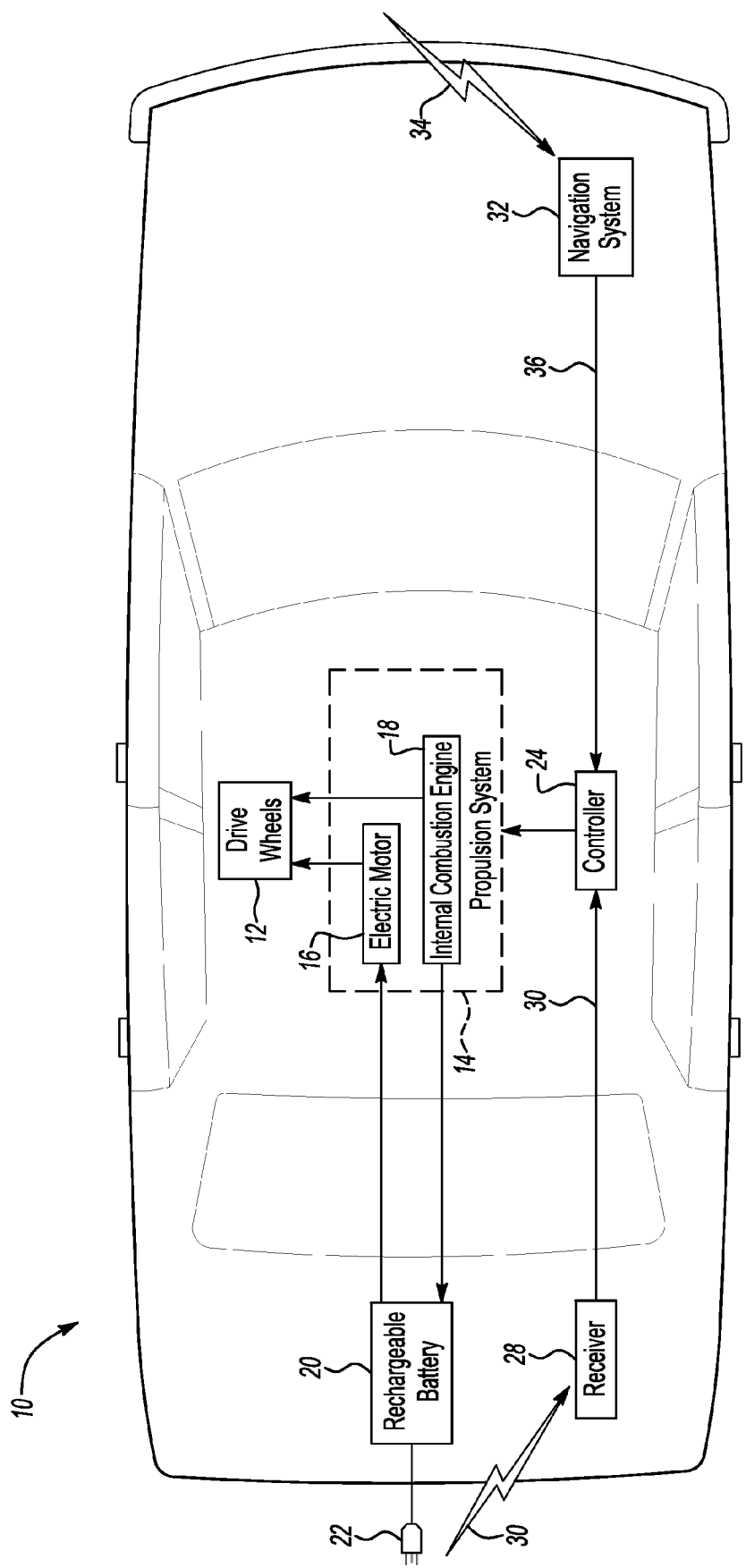
FIG. 2 illustrates a system for operating a plug-in hybrid electric vehicle having a controller configured to control an emissions output of the vehicle's propulsion system in response to an external signal requesting compliance with predetermined emissions standards wherein an internal combustion engine is configured to electrically charge a rechargeable battery.

With respect to FIG. 2, another embodiment of vehicle 10 is illustrated. Rechargeable battery 20 is configured to receive a charge not only from a household electrical outlet through plug 22, but also to receive a charge from ICE 16 which, through an intervening mechanism such as an alternator, may generate electricity which may be stored in rechargeable battery 20.

Vehicle 10 further includes a navigation system 32 such as a global positioning satellite based navigation system which receives satellite signals 34 and, through the use of triangulation or other methods is capable of calculating with substantial precision the location of vehicle 10 on the surface of the earth. Navigation system 32 is further configured to generate a location signal 36 and to transmit location signal 36 to controller 24. Location signal 36 may include information corresponding to the position of vehicle 10. A plurality of successive location signals 36 may be used by navigation system 32 to determine the direction of travel across the surface of the earth of vehicle 10.

In the embodiment illustrated in FIG. 2, controller 24 may receive external control signal 31 from receiver 28 and determine that a no-emissions requirement is associated with the designated geographic area. Controller 24 may also receive location signal 36 from which controller 24 may determine that vehicle 10 is not currently located within the designated geographic area and that there is no present need to operate propulsion system 14 in the no-emissions mode. In this manner, the use of navigation system 32 may help prevent controller 24 from unnecessarily switching propulsion system 14 to no-emissions mode and this avoid draining the electric energy stored in rechargeable battery 20.

In other embodiments, navigation system 32 may constantly generate location signal 36 and may constantly transmit location signal 36 to controller 24. In this manner, controller 24 may control propulsion system 14 to operate in a no-emissions mode once vehicle 10 enters the designated geographic area.

In still other embodiments, by comparing a series of successive location signals 36, controller 24 or navigation system 32 or both may determine that vehicle 10 is heading toward the designated geographic area. In such an event, controller 24 may control propulsion system 14 and cause ICE 16 to charge rechargeable battery 20 in anticipation of the arrival in the designated geographic area. In other embodiments, ICE 16 may be configured to charge rechargeable battery at varying rates. In such embodiments, upon determining that vehicle 10 is heading towards a designated geographic area, controller 24 may control propulsion system 14 such that ICE begins to more aggressively charge rechargeable battery 20 in anticipation of the arrival of vehicle 10 in the designated geographic area.

In still other embodiments, navigation system 32 may be configured to record a route traveled by a driver of vehicle 10. In such embodiments, navigation system 32 may include information in location signal 36 corresponding to the known route traveled by the driver or routes calculated by navigation system 32 when the vehicle operator enters a destination into the navigation system 32. Using the information contained in this location signal 36, controller 24 may determine that, despite the fact that vehicle 10 is not presently heading towards the designated geographic area, the recorded route will, nevertheless, take vehicle 10 to or through the designated geographic area. In this manner, controller 24 may utilize the recorded route information included in location signal 36 to determine that vehicle 10 will be heading into the designated geographic area and may initiate ICE 16 to charge or to more aggressively charge rechargeable battery 20 in anticipation of the arrival of vehicle 10 in the designated geographic area.

In still other embodiments, navigation system 32 may be configured to record a plurality of different routes traveled by a driver of vehicle 10 such as routes routinely and habitually traveled by the driver or routes calculated by navigation system 32 when the vehicle operator enters a destination into the navigation system 32. Navigation system 32 may be further configured to determine when vehicle 10 is traveling along one of the routes and may imbed such information in location signal 36 which, again, may be used by controller 24 to determine that vehicle 10 will be heading into a designated geographic area and to further control propulsion system 14 to cause ICE 16 to charge or more aggressively charge rechargeable battery 20.

In still other embodiments, navigation system 32 may be configured to record the route traveled by a plurality of different drives of vehicle 32. For example, some vehicles are equipped with memory seats which record the seating position of the various components of a vehicle seat associated with a first driver, a second driver, etc. In the same manner, vehicle 10 may include a mechanism for identifying which of a plurality of different drivers is currently driving vehicle 10. Navigation system 32 may be configured to determine when vehicle 10 is traveling along a recorded route for the one of the drivers currently driving vehicle 10 and may imbed that information in location signal 36 which, as set forth above, controller 24 may utilize to determine that vehicle 10 is heading into a designated geographic area and that ICE 16 should commence to charge or should commence a more aggressive charge of rechargeable battery 20.

In still other embodiments, navigation system 32 may be configured to record a plurality of different travel routes for a plurality of different drivers. Navigation system 32 may be further configured to determine which of the plurality of drivers is presently driving vehicle 10 and whether vehicle 10 is traveling along one of the different routes associated with this one of the drivers. Navigation system 32 may imbed such information into location signal 36 which controller 24 may then utilize to determine whether to control propulsion system 14 to cause ICE 16 to charge or to more aggressively charge rechargeable battery 20.

In the embodiment of vehicle 10 illustrated in FIG. 2, receiver 28 may be configured to receive a radio frequency signal, an infrared signal, a Wi-Fi signal, a cellular telephone signal, a satellite signal, or some combination of these or other signals. For instance, receiver 28 may be configured to receive a radio frequency signal, an infrared signal, and a Wi-Fi signal.

Figure 3:
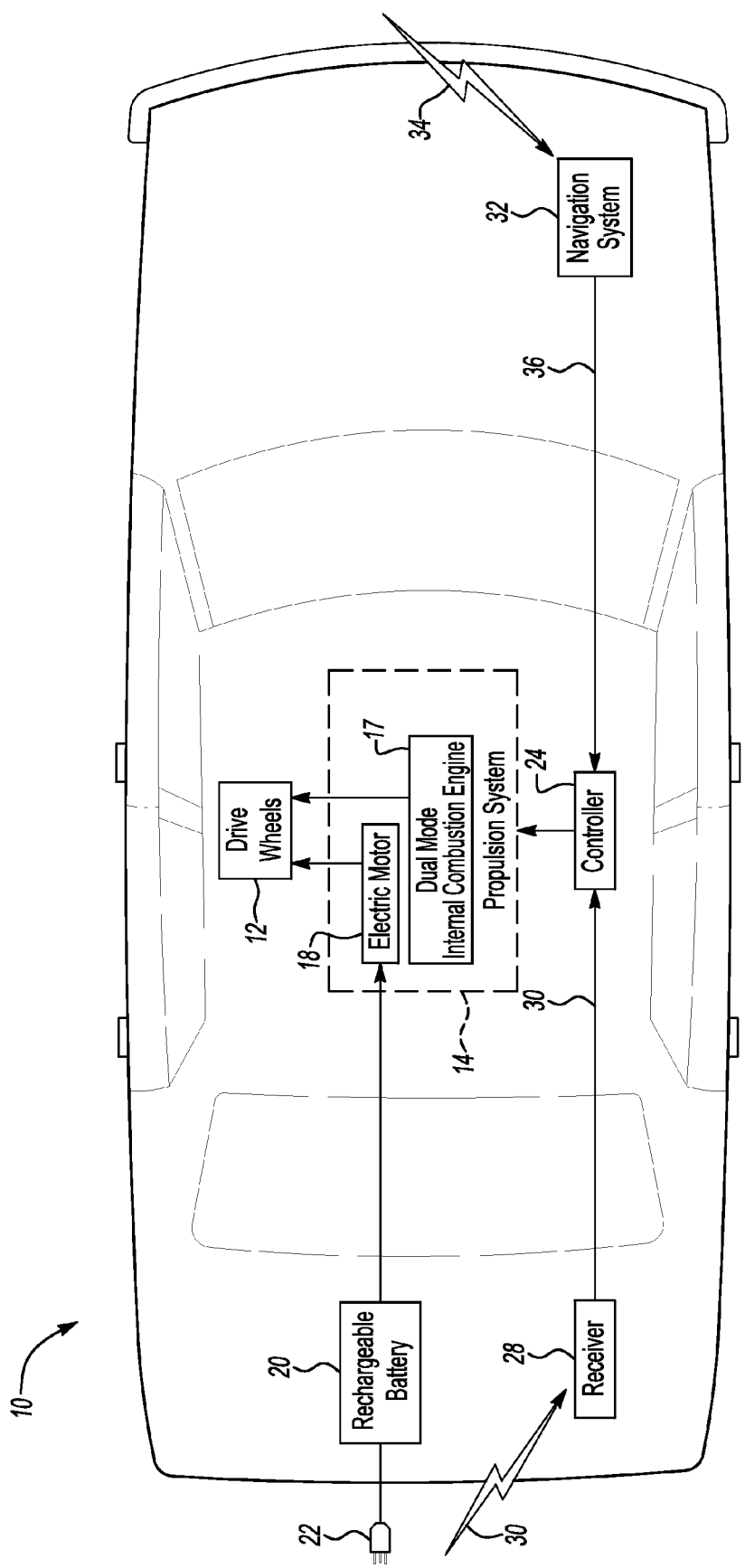
FIG. 3 illustrates a system for operating a plug-in hybrid electric vehicle having a controller configured to control an emissions output of the vehicle's propulsion system in response to an external signal requesting compliance with predetermined emissions standards and when an internal combustion engine of the propulsion system is configured to operate in a standard emissions mode and a low emissions mode.

With respect to FIG. 3, a third embodiment of vehicle 10 is illustrated. In the embodiment illustrated in FIG. 3, vehicle 10 includes a dual mode ICE 17 which is configured to operate in a standard emissions mode and in a low emissions mode. In this embodiment, in response to receiving an external control signal 30, controller 24 may be configured to control propulsion system 14 to operate in a no-emissions mode by disabling dual mode ICE 17.

In situations where rechargeable battery 20 is charged with an amount of electric energy that is insufficient to power electric motor 18 to propel vehicle 10 without the assistance of dual mode ICE 17, controller 24 may control propulsion system 14 such that electric motor 18 and dual mode ICE together deliver torque to drive wheel 12 while further controlling dual mode ICE to operate in the low emissions mode. When propulsion system 14 is operated in this manner, propulsion system 14 is operating in a reduced emissions mode. This configuration permits vehicle 10 to continue operating in the designated geographic area even though rechargeable battery 20 contains an insufficient amount of power to propel vehicle 10 in no-emissions mode while still reducing undesirable tailpipe emissions.

In other embodiments, in situations where vehicle 10 is being propelled by propulsion system 14 while propulsion system 14 is operating in the no-emissions mode, when controller 24 detects that rechargeable battery 20 has drained to a level wherein rechargeable battery 20 is no longer capable of providing electricity to electric motor 18 sufficient to allow electric motor 18 to operate without the assistance of dual mode ICE 17, controller 24 may control propulsion system 14 to discontinue operations in the no-emissions mode and to commence operations in the reduced emissions mode.

The embodiment illustrated in FIG. 3 may be configured to include a switch such as switch 26 illustrated in FIG. 1 which may be used by an occupant of vehicle 10 to direct controller 24 to initiate a no-emissions mode or a reduced emissions mode operation of propulsion system 14. In such configurations, a governmental agency may post signs or broadcast via electronic means that the designated geographic area has a no-emissions requirement associated with it. Upon perceiving the transmission, an occupant of vehicle 10 may move the switch from a normal emissions mode to a no-emissions mode. The controller 24 may then determine whether no-emissions mode operation of the propulsion system 14 is feasible or whether a reduced emissions mode operation of the propulsion system 14 should be employed.

In other embodiments, vehicle 10 may include navigation system 32 and receiver 28. Navigation system 32 may receive satellite signals 34 to calculate the location of vehicle 10 on the surface of the earth and may transmit location signal 36 to controller 24. Vehicle 10 may also include receiver 28 configured to receive an external control signal 30. Receiver 28 may transmit external control signal 30 to controller 24. External control signal 30 may include information containing a no-emissions requirement for the designated geographic area. Using external control signal 30 and the location signal 36, controller 24 may determine whether vehicle 10 is presently located within a designated geographic area and may control propulsion system 14 to commence operations in a no-emissions mode or a reduced emissions mode depending on the state of charge of battery 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A hybrid electric vehicle comprising:
    a propulsion system including an internal combustion engine (ICE) and an electric motor, each configured to propel the vehicle individually or in parallel with each other;
    a battery configured to deliver power to the electric motor; and
    a controller configured to control the propulsion system to operate in a normal emissions mode wherein the ICE is enabled to propel the vehicle and a no-emissions mode wherein the ICE is disabled;
    wherein the controller is further configured to direct the propulsion system to operate in the no-emissions mode in response to an external control signal transmitted to the vehicle from a source positioned external to the vehicle, and to control the ICE to charge the battery or increase the rate of charge of the battery when the controller determines that the vehicle is heading towards a designated geographic area.

2. The hybrid electric vehicle of claim 1 further comprising a receiver configured to receive the external control signal such that the receiver transmits the external control signal to the controller to automatically control the propulsion system to operate in the no-emissions mode.

3. The hybrid electric vehicle of claim 2 wherein the receiver is configured to receive radio frequency signals.

4. The hybrid electric vehicle of claim 2 wherein the receiver is configured to receive infrared signals.

5. The hybrid electric vehicle of claim 2 wherein the receiver is configured to receive at least one of a wireless fidelity (Wi-Fi) signal or a signal transmitted by a portable device configured to connect wirelessly to the internet.

6. The hybrid electric vehicle of claim 2 wherein the receiver is configured to receive cellular telephone signals.

7. The hybrid electric vehicle of claim 2 wherein the receiver is configured to receive a satellite signal.

8. A hybrid electric vehicle comprising:
    a propulsion system configured to propel a vehicle throughout normal operations of the vehicle, the propulsion system including an internal combustion engine (ICE) and an electric motor, the ICE and the electric motor being configured to operate in parallel, the ICE and the electric motor each being further configured to individually propel the vehicle;
    a rechargeable battery configured to deliver power to the electric motor to enable the propulsion system to propel the vehicle for a certain distance of vehicle travel without operation of the ICE, the rechargeable battery being further configured to receive electrical power from the ICE and also to receive electrical power from at least one of a remote charger, a charging station or a power outlet of a household;
    a controller configured to control the propulsion system to operate in a normal emissions mode wherein the ICE is enabled to propel the vehicle and a no-emissions mode wherein the ICE is disabled;
    a receiver configured to receive an external control signal from a source positioned external to the vehicle such that the receiver transmits the external control signal to the controller; and
    a navigation system configured to generate a location signal corresponding to a geographic area in which the vehicle is positioned such that the navigation system transmits the location signal to the controller,
wherein the external control signal includes information indicative of an emissions requirement for a designated geographic area, the controller being further configured to:
determine whether the vehicle is located within the designated geographic area based on the location signal, and
control the propulsion system to operate in the no-emissions mode in response to the receiver receiving the external control signal while the vehicle is located within the designated geographic area, the controller being further configured to:
control the ICE to charge the rechargeable battery,
determine whether the vehicle is heading towards the designated geographic area based on a plurality of the location signals, and
control the ICE to charge the rechargeable battery when the controller determines that the vehicle is heading towards the designated geographic area.

9. The hybrid electric vehicle of claim 8 wherein the navigation system is further configured to record a driver's travel route and wherein the controller is further configured to control the ICE to charge the rechargeable battery when the navigation system determines that the vehicle is traveling along a recorded driver travel route and that the recorded driver travel route passes through the designated geographic area.

10. The hybrid electric vehicle of claim 9 wherein the navigation system is further configured to record a plurality of different driver travel routes that the driver travels and wherein the controller is further configured to control the ICE to charge the rechargeable battery when the navigation system determines that the vehicle is traveling along one of the different driver travel routes and that the one of the different driver travel routes passes through the designated geographic area.

11. The hybrid electric vehicle of claim 9 wherein the navigation system is further configured to record the travel route for a plurality of different drivers and wherein the controller is further configured to control the ICE to charge the rechargeable battery when the navigation system determines that the vehicle is traveling along the recorded driver travel route associated with one of the different drivers and that the recorded driver travel route passes through the designated geographic area.

12. The hybrid electric vehicle of claim 11 wherein the navigation system is further configured to record a plurality of different travel routes associated with each driver of the different drivers and wherein the controller is further configured to control the ICE to charge the rechargeable battery when the navigation system determines that the vehicle is traveling along one of the different travel routes of an associated one of the drivers and that the one of the different travel routes passes through the designated geographic area.

13. The hybrid electric vehicle of claim 8 wherein the receiver is further configured to receive at least one of a radio frequency signal, an infrared signal, a Wi-Fi signal, a cellular telephone signal, or a satellite signal.

14. The hybrid electric vehicle of claim 8 wherein the receiver is further configured to receive a radio frequency signal, an infrared signal, and a Wi-Fi signal.

15. A hybrid electric vehicle comprising:
a propulsion system configured to propel a vehicle throughout normal operations of the vehicle, the propulsion system including an internal combustion engine (ICE) and an electric motor, the ICE and the electric motor being configured to operate in parallel, the ICE and the electric motor each being further configured to propel the vehicle individually, the ICE being further configured to operate in a standard emissions mode and in a low emissions mode
a rechargeable battery configured to deliver power to the electric motor to enable the propulsion system to propel the vehicle for a certain distance of vehicle travel without operation of the ICE and to receive electrical power from at least one of a remote charger, a charging station or a power outlet of a household; and
a controller configured to control the propulsion system to operate in a normal emissions mode wherein the ICE is enabled to operate in the standard emissions mode, a reduced emissions mode wherein the ICE is enabled to operate in the low emissions mode, and a no-emissions mode wherein the ICE is disabled;
wherein the controller is further configured to control the propulsion system to operate in the no-emissions mode in response to an external control signal transmitted to the vehicle from a source positioned external to the vehicle, and to control the propulsion system to operate in the reduced emissions mode when the external control signal is transmitted to the vehicle during a period when the rechargeable battery has an amount of stored electrical energy that is insufficient to propel the vehicle without assistance from the ICE.

16. The hybrid electric vehicle of claim 15 wherein the controller is further configured to control the propulsion system to discontinue operations in the no-emissions mode and to commence operations in the reduced emissions mode when the amount of electrical energy stored in the battery is depleted to a level that is insufficient to operate the vehicle without assistance from the ICE.

17. The hybrid electric vehicle of claim 15 further comprising a receiver configured to receive the external control signal, wherein the controller is further configured to automatically direct the propulsion system to operate in one of the reduced emissions mode or the no-emissions mode when the receiver receives the external control signal.

18. The hybrid electric vehicle of claim 17 further comprising a navigation system connected to the controller, the navigation system being configured to generate a location signal corresponding to a geographic area in which the vehicle is positioned such that the navigation signal transmits the location signal to the controller, wherein the external control signal includes information indicative of an emissions requirement for a designated geographic area, the navigation system being further configured to determine whether the vehicle is located within the geographic area, the controller being further configured to control the propulsion system to operate in one of the no-emissions mode and the reduced emissions mode in response to the receiver receiving the external control signal while the vehicle is located within the designated geographic area.

* * * * *